Patented Oct. 24, 1933

1,932,255

UNITED STATES PATENT OFFICE 1,932,255

MOLDING COMPOSITION OF FIBROUS VEGETABLE MATERIAL AND FURFURAL

Earl C. Sherrard and Edward Beglinger, Madison, Wis., dedicated to the Government and People of the United States No Drawing. Application July 15, 1931
Serial No. 551,068

8 Claims. (Cl. 106—22)

(Granted under the act of March 3, 1883, as amended April 30, 1928; 370 O. G. 757)

This application is made under the act approved April 30, 1928, and our invention herein described, if patented, may be manufactured and used by or for the Government, for governmental purposes, without payment to us of any royalty thereon.

We hereby dedicate the invention herein described to the free use of the public to take effect upon the granting of a patent to us.

This invention relates to a molding compound wherein a hydrolyzed vegetable fibrous material, more specifically wood, is incorporated with phenols or with aldehydes such as furfural and a mineral acid to form, with the application of heat and pressure, a hard, resinous condensation product.

The application of the varied hydrolysis treatments to vegetable fibrous material is well known in the arts. The type or conditions of the hydrolysis and the nature of the material used are factors which influence the modification of the fibrous material and the amount of sugars which are obtained by the conversion.

It is known that furfural and lignin in the presence of a catalyst such as hydrochloric or sulphuric acids yield a condensation or resinous product. We do not intend to confuse this patented process and product with our procedure as later described.

It is the object of this invention to use the sugar-containing or sugar-free modified cellulose or ligno-cellulose resulting from the hydrolysis of fibrous material, wherein the lignin value has been materially increased and the cellulose substantially modified in comparison to unhydrolyzed fibrous material.

We have found that under the application of heat and pressure there is also a marked modification or resinifying effect upon hydrolyzed cellulose in the presence of an aldehyde, such as furfural, and hydrochloric acid.

When a mixture of the above acidified, hydrolyzed fibrous materials and an aldehyde are compressed with the application of heat, a reaction takes place resulting in the formation of an extremely hard and dense, resinous condensation product.

It is not our intention to limit ourselves to the application of acid hydrolysis to the fibrous material, to a given lignin-cellulose ratio or extractive content value in the hydrolyzed fibrous material nor to one particular temperature, pressure or concentration of ingredients when molding or forming a mixture to produce the condensation or resinous product.

The method of procedure in the preparation of the ingredients and the pressing, forming, or molding of the same is illustrated in the following typical example:

Preference is made in this invention to the use of maple wood which has been hydrolyzed for 45 minutes at 120 pounds per square inch steam pressure in the presence of 3 per cent sulphuric acid catalyzer.

One hundred parts of finely ground hydrolyzed fibrous material is acidified with 0.5 part of hydrochloric acid and treated with 5 parts of furfural. The mixture is transferred to a steam mold, subjected to a pressure of 2000 pounds per square inch and a temperature of 120° C., for 15 minutes; under which conditions a reaction takes place resulting in the formation of a hard and resinous condensation product.

Under conditions as described immediately above, but substituting 5 parts of phenol or phenolic substance for the furfural, a resinified or condensation product is also obtained.

The molding mixtures as described above and containing 1 part or less of aniline or other aromatic amine, when molded insure a more highly water-resistant product.

We claim:

1. A molding composition consisting of hydrolyzed ligno-cellulose, furfural, and a mineral acid.
2. A molding composition consisting of hydrolyzed ligno-cellulose, furfural, a mineral acid, and an aromatic amine.
3. A molding composition consisting of sugar-free hydrolyzed ligno-cellulose, furfural, and a mineral acid.
4. A molding composiiton consisting of sugar-free hydrolyzed ligno-cellulose furfural, a mineral acid, and an aromatic amine.
5. A molding composition consisting of sugar-containing hydrolyzed ligno-cellulose, furfural, and a mineral acid.
6. A molding composition consisting of sugar-containing hydrolyzed ligno-cellulose, furfural, a mineral acid, and an aromatic amine.
7. A molding composition consisting of hydrolyzed cellulose, furfural, and a mineral acid.
8. A molding composition consisting of hydrolyzed cellulose, furfural, a mineral acid, and an aromatic amine.

EARL C. SHERRARD.
EDWARD BEGLINGER.